(12) United States Patent
Jonsson

(10) Patent No.: US 6,272,214 B1
(45) Date of Patent: Aug. 7, 2001

(54) AUTOMATIC CONTROL OF PARTICIPATION IN TELEMEETINGS

(75) Inventor: Björn Jonsson, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/977,070

(22) Filed: Nov. 24, 1997

(51) Int. Cl.[7] ...................................................... H04M 3/42
(52) U.S. Cl. ............................ 379/202; 379/203; 370/262
(58) Field of Search .................................. 379/202, 203, 379/204, 205, 206; 370/260, 261, 262, 263, 264

(56) References Cited

U.S. PATENT DOCUMENTS

| | | | |
|---|---|---|---|
| 4,577,065 | 3/1986 | Frey et al. | 179/18 BC |
| 4,796,293 | 1/1989 | Blinken et al. | 379/202 |
| 5,012,509 | 4/1991 | Nakamura et al. | 379/53 |
| 5,136,581 | 8/1992 | Muehrcke | 370/62 |
| 5,323,445 | 6/1994 | Nakatsuka | 348/15 |
| 5,369,694 | 11/1994 | Bales et al. | 379/206 |
| 5,408,526 | 4/1995 | McFarland et al. | 379/202 |
| 5,475,747 * | 12/1995 | Bales et al. | 379/201 |
| 5,495,284 | 2/1996 | Katz | 348/15 |
| 5,530,472 | 6/1996 | Bregman et al. | 348/15 |
| 5,555,017 | 9/1996 | Landante et al. | 348/15 |
| 5,555,298 | 9/1996 | Jonsson | 379/207 |
| 5,581,702 * | 12/1996 | McArdle et al. | 709/204 |
| 5,585,839 | 12/1996 | Ishida et al. | 248/15 |
| 5,590,127 | 12/1996 | Bales et al. | 370/260 |
| 5,781,731 * | 7/1998 | Koreeda et al. | 709/204 |
| 5,812,653 * | 9/1998 | Jodoin et al. | 379/205 |
| 5,844,973 * | 12/1998 | Venkatraman et al. | 379/127 |
| 5,951,637 * | 9/1999 | Kuzma | 709/204 |
| 5,953,400 * | 9/1999 | Rosenthal et al. | 379/202 |
| 5,995,607 * | 11/1999 | Beyda et al. | 379/202 |
| 5,999,525 * | 12/1999 | Krishnaswamy et al. | 370/352 |
| 6,005,845 * | 12/1999 | Svennesson et al. | 370/260 |
| 6,038,304 * | 3/2000 | Hart | 379/202 |

FOREIGN PATENT DOCUMENTS

| | | | |
|---|---|---|---|
| 9724864 | 7/1997 | (WO) | H04M/3/56 |

* cited by examiner

*Primary Examiner*—Ahmad Matar
*Assistant Examiner*—Benny Q. Tieu
(74) *Attorney, Agent, or Firm*—Jenkens & Gilchrist, P.C.

(57) ABSTRACT

One or more unique identifiers are created which are associated directly with an upcoming telemeeting. For example, a unique identifier can be a preselected telephone number in a PSTN, or a URL that identifies an address on the World Wide Web. In one embodiment, a telemeeting is administered automatically under the control of a communications network's service node. Intended participants are invited to the meeting by including the unique identifier along with a notification message, such as, for example, in a facsimile message, e-mail message, page message, voice mail message, or bulletin board announcement. Using the unique identifier and suitable terminal equipment, any recipient of the notification message can call the telephone number (or click on the URL). In response to such a call, the service node generates and distributes to the recipient caller a personal reference, which is a unique telephone number (or URL address). The recipient caller then uses the personal reference to access and join the telemeeting via an appropriate node (e.g., to minimize calling distance, costs, etc.).

30 Claims, 3 Drawing Sheets

AUTOMATIC CONTROL OF PARTICIPATION IN TELEMEETINGS

BACKGROUND OF THE INVENTION

1. Technical Field of the Invention

The present invention relates in general to the telecommunications field and, in particular, to a method and apparatus for use in automatically arranging for, and controlling participation in, telemeetings.

2. Description of Related Art

A basic service offered by telecommunications networks is to provide a communications connection between at least two parties for a certain period of time. The process of providing this telecommunications service can be described conceptually as arranging a telecommunications meeting between the participants (i.e., a so-called "telemeeting"). Ever since the emergence of this telemeeting concept, a number of pertinent questions have been raised, such as: How is it possible for a communications network manager to (1) effectively manage a telemeeting involving numerous participants, (2) control participation in a telemeeting (e.g., should the meeting be open to anyone), (3) enable participants to join a telemeeting from any location, and (4) schedule a telemeeting in terms of both time and place? Inevitably, in a conventional heterogeneous communications environment, telemeeting participants will attempt to gain admittance to a session in a number of different ways. However, from a conference planning and management standpoint, conventional communication networks are unable to determine beforehand just how and where individual participants will be attempting to gain admittance to such a telemeeting.

Teleconferencing is one basic service offered by conventional telecommunications systems whereby a limited number of participants can confer simultaneously with each other. However, the basic services now being offered typically do not offer any type of conference management support. In other words, the communication connections between the conference participants are made by the person who has asked for and initiated the telemeeting. Typically, the person initiating the meeting calls each participant in turn, which requires prior knowledge of the participants' calling addresses.

The AT&T long distance telephone network offers a teleconferencing service known as the "Alliance Dedicated Teleconferencing Service." This service can connect conference call participants together on up to 56 telephone lines. These conference calls are set up and controlled by AT&T operators with access to an AT&T conference management system. However, a limitation of this service is that the teleconference has to be booked in advance, which requires personal assistance from an AT&T operator. In an attempt to improve on the Alliance service in this regard, U.S. Pat. No. 4,796,293 entitled "Enhanced Dedicated Teleconferencing System" discloses a service computer which is used as an intermediary between the Alliance system and a non-AT&T conference coordinator. Consequently, the conference coordinator has conference management capabilities similar to those of an AT&T operator.

Another teleconferencing system is disclosed in U.S. Pat. No. 5,369,694, which is entitled "Unattended Meet-Me-Conference Controlled By A Telephone Terminal." Essentially, this patent discloses a method for automatically connecting teleconference participants who can register for the conference by calling a predetermined telephone number. A telephone terminal (capable of executing application software programs) provides certain teleconferencing management and control functions, and uses control signals to communicate with the telecommunications network and establish connections for all conference participants. The disclosed system employs a modified Integrated Services Digital Network (ISDN) protocol to control the transfer of signalling and speech data. However, a problem with such a system is that special "intelligent" terminal equipment is required, which can limit the ultimate use of the service provided. Also, the use of an ISDN protocol can be technically and/or financially prohibitive for certain network operators.

Furthermore, in order to obtain a global level of service with conventional methods, the necessary ISDN protocol would be required in all networks through which conference participants connect to a conference. An important advantage of the present invention is its independence from such restrictions.

Another disadvantage of the conventional conferencing methods is that only one mode of participation can be used based on a telephone connection. Consequently, in order to participate in a conference, there must be a telecommunications network available which excludes participation through, for example, a data network. The present invention advantageously allows a mixture of modes including participation through, for example, the Internet.

SUMMARY OF THE INVENTION

A method and system are provided in which one or more unique identifiers are created which are associated directly with an upcoming telemeeting. For example, a unique identifier can be a preselected telephone number in a Public Switched Telephone Network (PSTN), or a Uniform Resource Locator (URL) that identifies an address on the World Wide Web (WWW). In a preferred embodiment of the invention, a telemeeting is administered automatically under the control of a communications network's service node. Intended participants are invited to the meeting by including the unique identifier along with a notification message, such as, for example, in a facsimile message, e-mail message, page message, voice mail message, or WWW bulletin board announcement. As a result, using one of the unique identifiers and suitable terminal equipment, any recipient of the notification message can call the telephone number (or click on the URL), and under the control of the service node, be connected to the telemeeting from any location.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Essentially, in accordance with the present invention, a communications system creates a unique identifier which is associated directly with an upcoming telemeeting, rather than with a particular piece of terminal equipment (e.g., a conference administrator's "intelligent" telephone). For example, depending on the surrounding communications environment, the unique identifier can be a preselected telephone number in a Public Switched Telephone Network (PSTN), or a Uniform Resource Locator (URL) that identifies an address on the World Wide Web. In a preferred embodiment of the present invention, a conference administrator initiates a telemeeting, which is created and administered automatically under the control of a conference service node. The conference service node is coupled to a telecommunications network. The intended participants can be invited to the meeting by including the unique identifier along with a notification message, such as, for example, in a facsimile message, e-mail message, page message, voice mail message, bulletin board announcement (e.g., at a World Wide Web site), etc. If the conference service node is coupled to a cellular communications network, such as a Global System for Mobile Communications (GSM) network, the unique identifier can be generated by the conference service node and transmitted by the network in a Short Message Service (SMS) text message to one or more GSM subscribers (who are also intended participants).

Using the unique identifier and suitable terminal equipment, any recipient of the notification message desiring to participate in the conference can, for example, call the telephone number provided (or click on the URL, etc.) in order to make a request to participate in the conference. In response to receiving such a request to participate (via a telephone call, URL, etc.), the conference service node generates a reference identifier personalized for that requester. That personal reference identifies a specific meeting "location" for that requester. Using that personal reference (telephone number, etc.) and suitable terminal equipment, that requester can access the conference via that meeting location (e.g., a selected communications node, such as a host processor, communications controller, cluster controller, terminal, etc.). Consequently, in accordance with the present invention, any bona fide telemeeting participant can connect to and join the telemeeting from any remote location via the most appropriate communications node (e.g., to minimize calling distance, costs, etc.).

Figure 1:
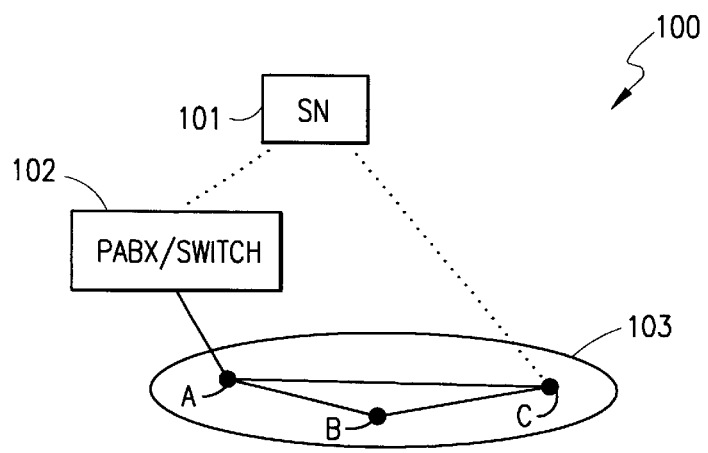
FIG. 1 is a simplified block diagram of a system that can be used to implement the preferred embodiment of the present invention.

Specifically, FIG. 1 is a simplified block diagram of a system that can be used to implement the preferred embodiment of the present invention. System 100 includes a conference service node 101 which is capable of controlling and performing certain communications processing and switching functions. The switching functions can be implemented either in a switch 102 (e.g., a Private Automatic Branch Exchange or PABX), or by the service node 101 directly controlling the switching functions in a PSTN 103. In a cellular network, for example, switch 102 can be a communications node in a mobile communications service center (MSC). An example of such a node can be found in an AXE 10 Digital Switching System manufactured by Ericsson Telecom AB. In FIG. 1, the dotted lines denote signalling connections, while the solid lines denote speech communications. As shown, each telemeeting participant can be connected for speech communications to service node 101 via a communications node A, B or C and/or switch 102.

A plurality of telephone numbers associated with the PSTN 103 are reserved for use with certain services (including telemeetings) that can be implemented in the conference service node 101. In a dialog with the service node (e.g., via a communications terminal), a telemeeting administrator (e.g., conference originator or coordinator) addresses the service node and executes initialization commands to initiate the conference and prepare a future (or subsequent or upcoming) session which is valid for a predetermined period of time. Consequently, the service node 101 allocates (for that predetermined period of time) at least one of the plurality of phone numbers for the upcoming meeting session. The conference service node 101 provides a list of the temporary telephone numbers (unique identifiers) allocated to the session to the telemeeting administrator (e.g., via the terminal), who distributes one or more of the temporary telephone numbers or other temporary references (e.g., a URL) in an "invitation" message to intended participants. The "invitation message" can be broadcast (open-ended) or conveyed directly to individual invitees. After receiving the "invitation" message, the intended participants can call at any time just before or after the announced time, the one or more telephone numbers which are allocated to the upcoming session. Each such call is queued and processed by the application software (in accordance with the session-defined data), which is executed by a processor (not explicitly shown) in the service node 101.

For example, an intended participant who is located closer to node B than node A or C can be given a telephone number for access to the conference through node B. Similarly, an intended participant who is located closer to node C than node A or B can be given a telephone number for access through node C. The conference service node 101 selects the appropriate node (e.g., A, B or C) that a specific participant can use to access the conference. Notably, apart from selecting a particular access node for an intended participant for geographical reasons, the conference service node can select an access node for other reasons as well. A particular node may be defined to handle communications in a specific format. For example, an access node may be defined to handle traffic from participants who prefer to type and read text on a data terminal. Also, particular nodes may be defined for different mixed groups of participants, whereby some participants use a telephone (speech connection) and other participants use a form of data communications.

Figure 2:
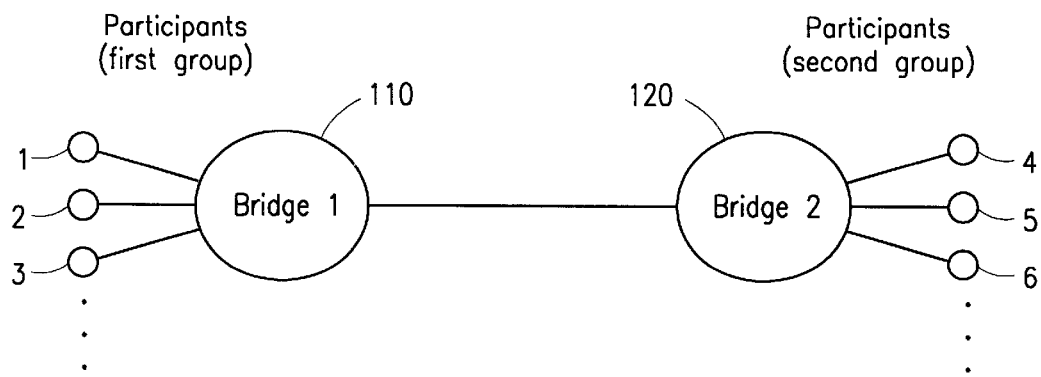
FIG. 2 is a diagram that more generally illustrates an arrangement that can be used for intended participants to access and participate in a telemeeting, in accordance with the preferred embodiment of the present invention.

FIG. 2 is a diagram that more generally illustrates an arrangement that can be used for intended participants to access and participate in a telemeeting, in accordance with the preferred embodiment of the present invention. FIG. 2 shows a plurality of "physical" meeting locations in the form of conference bridges 110 and 120. Although only two conference bridges are shown for illustrative purposes, more than two conference bridges could be used. A first plurality of intended participants (1, 2, 3) in a first group have each received a personal reference from the conference service node (not explicitly shown) in response to the participants' respective requests to participate in the conference. The first group's personal references identify one or more addresses (e.g., URLs) or telephone numbers associated with the first conference bridge 110. A second plurality of intended participants (4, 5, 6) in a second group also have each received a personal reference from the conference service node in response to those participants' respective requests to participate in the conference. The second group's personal references identify one or more addresses (e.g., URLs) or telephone numbers associated with the second conference bridge 120. Consequently, the first group of participants (1, 2, 3) can access and participate in the conference via the first conference bridge 110, and the second group of participants (4, 5, 6) can access and participate in that same conference via the second conference bridge 120. The conference service node (not explicitly shown in FIG. 2) generates and maintains control over all of the personal references, and as such, manages a so-called "virtual" conference.

Figure 3:
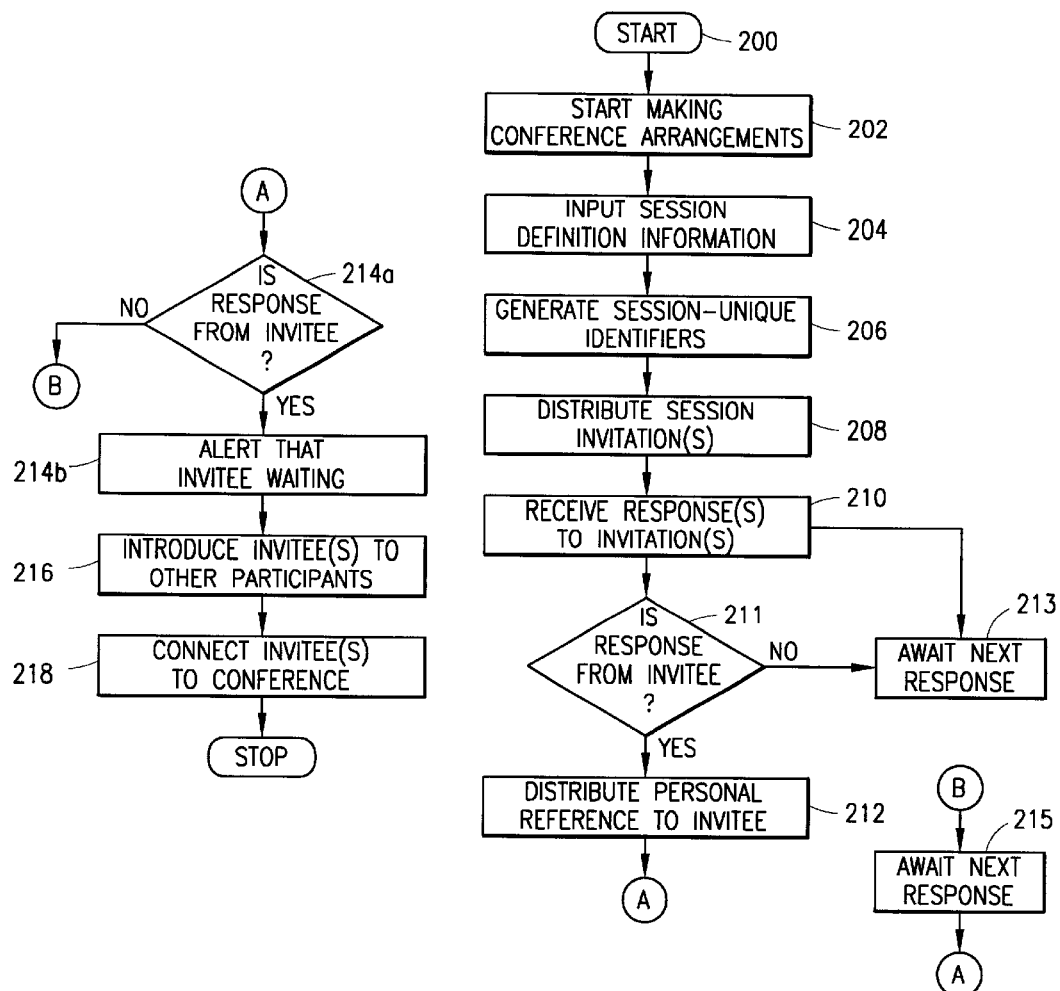
FIG. 3 is a flow diagram of an exemplary method that can be used to implement the present invention.

FIG. 3 is a flow diagram of an exemplary method that can be used to implement the preferred embodiment of the invention. At step 202, a telemeeting (e.g., telephone conference) is arranged. Using an appropriate communications terminal, a telemeeting administrator (arranger) creates a conference session during a dialog with the conference service node (101). During that dialog, at step 204, the administrator indicates to the service node (101) that the session is scheduled to occur at a specific date and time. At step 206, the service node (101) allocates one or more temporary telephone numbers (or, for example, URLs for a website location) to the telemeeting administrator. The temporary telephone numbers are valid for, and associated directly with, the upcoming telemeeting session. At step 208, the administrator distributes (e.g., by e-mail, page, broadcast, etc.) the temporary telephone numbers (URLS, etc.) in an invitation message to intended session participants. At step 210, just prior to or during the session, any of the invited participants can call the temporary telephone number (or click on a URL) in order to make a request to join the conference. At step 212, if an invited participant calls the temporary telephone number (or, for example, clicks on the invitation URL), the conference service node distributes a personal reference telephone number (or URL) to that participant. That personal number is associated with a particular conference bridge 110 or 120 (FIG. 2). Consequently, that participant can access and join the conference via that conference bridge. For the preferred embodiment, each conference bridge (110, 120) can be a communications switch or node in a PSTN or Public Land Mobile Network (PLMN), or a host computer providing a data network voice service.

At step 214, if an invitee calls the personal telephone number during the session, then the conference service node (101) generates an alert message, which notifies the session administrator (e.g., via a terminal monitor) that the invitee is waiting to join the session. If, however, the caller is not an invitee, at step 215, that call can be disregarded (if the telemeeting administrator so desires). At step 216, the telemeeting administrator can introduce the waiting invitee(s) to the conference at an appropriate time. At step 218, the telemeeting administrator can then connect (e.g., by pushing on a button or clicking on a hyperlink) the new participant(s) to the conference. In response, the service node (101) directs the switch (e.g., 102 for one group of participants) to connect the calling participant(s) into the conference.

Figure 4:
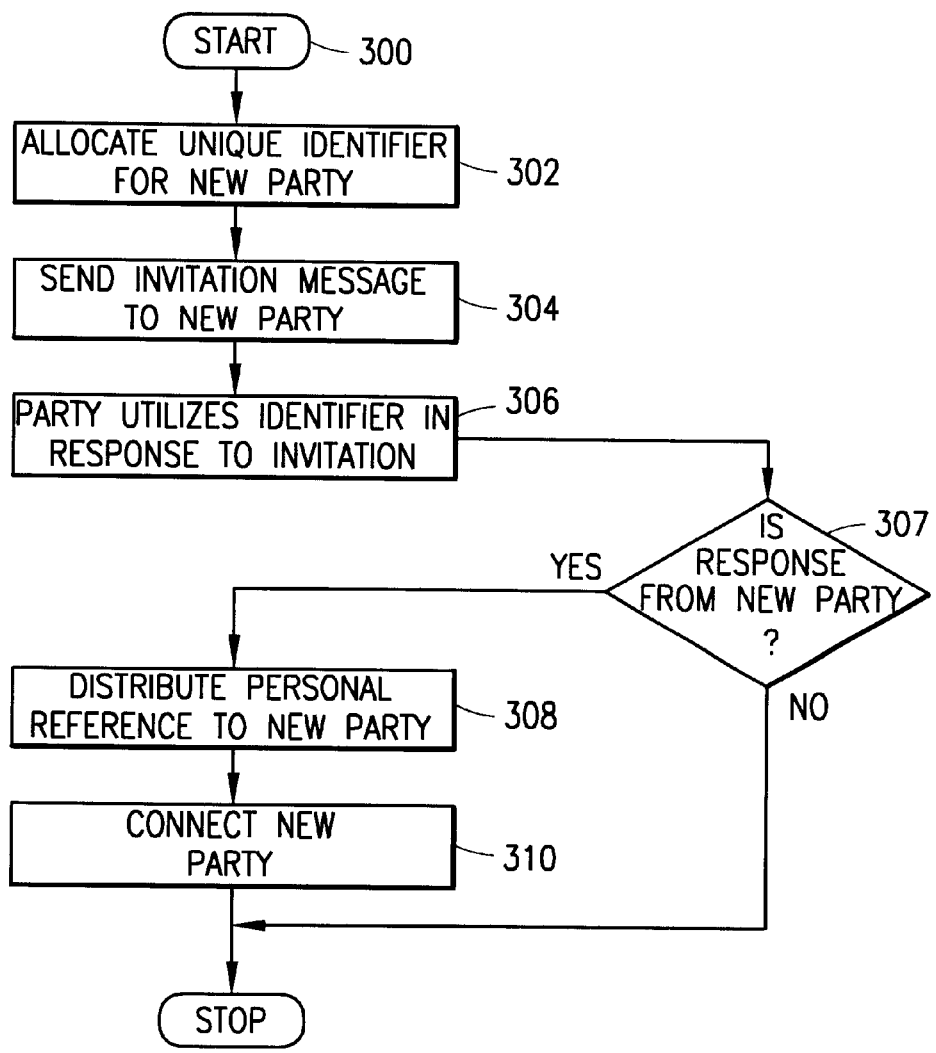
FIG. 4 is a flow diagram of a second method that can be used to implement the preferred embodiment of the present invention.

FIG. 4 is a flow diagram of a second method that can be used to implement the preferred embodiment of the invention. Essentially, this method relates to a situation where a telemeeting is already in session between at least two participants, and another party is to be added. In a conventional system, the ongoing session would have been placed on hold, and a call would have been placed to the additional party in an attempt to bring that party into the session. In contrast, and in accordance with the present invention, at step 302, the service node (101) allocates a temporary telephone number (or URL, etc.) for use by the additional party. At step 304, an "invitation message" is issued (e.g., over a paging network, broadcast, etc.) which includes the temporary telephone number (or URL, etc.). At step 306, upon receiving the "invitation" message (including the temporary telephone number), the additional party can call the temporary number (or click on the URL, etc.). At step 308, in response to the call to the temporary number, the conference service node (101) distributes a personal number to that additional party. At step 310, the additional party calls that personal telephone number and is automatically connected by the service node (101) and switch (102) into the ongoing session.

Alternatively, instead of receiving a temporary telephone number (URL, etc.) in an "invitation" message, a party can receive a personal number in the "invitation" message. Consequently, the party can call that personal number and be connected automatically by the service node and switch to the session. This method and the above-described method of receiving and calling a personal number (URL, etc.) after using the temporary number in the "invitation" message, can be automated by logic executed in a user's (e.g., an invite's) mobile terminal. Additionally, the user of the mobile terminal can respond to the "invitation" message with a reference number for a fixed terminal which will ultimately be used for the communication with the conference. Subsequently, the conference manager can use the submitted reference number to set up a connection between the fixed terminal and the conference. A method for using a mobile terminal for obtaining such services (conferencing, etc.) with a fixed terminal by remote control is described in commonly-assigned U.S. patent application Ser. No. 08/705,851.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

For example, in accordance with the present invention, instead of a service node distributing invitation messages including one or more temporary telephone numbers (e.g., for an upcoming teleconferencing call), the service node can distribute invitation messages including a URL. The URL can identify a location on the World Wide Web where a "chat room" can be utilized for the upcoming session. In other words, the present invention is not intended to be limited to a specific conference communications medium.

What is claimed is:

1. A method for implementing an automated telemeeting session in a system comprising a plurality of service nodes, each one of said plurality of service nodes connected to at least a telecommunications network and having control of a plurality of communications nodes, said method comprising the steps of:

having authenticated and authorized access to one of said plurality of service nodes, a conference administrator inputting definition information to said one of said plurality of service nodes to define the telemeeting session;

responsive to said definition information, outputting from said one of said plurality of service nodes at least one identifier associated with the telemeeting session;

distributing said at least one identifier in an invitation message to at least one of a plurality of intended session participants;

receiving at a first of said plurality of communications nodes associated with said at least one identifier, a response to participate, from said at least one of said plurality of intended session participants, said response further including at least one user preference;

distributing, from said one of said plurality of service nodes, a personal reference to said at least one of said plurality of intended session participants, said personal reference associated with a second of said plurality of communications nodes, said second of said plurality of communications nodes associated with said at least one user preference;

receiving at said second of said plurality of communications nodes a request to participate in said telemeeting session from said at least one of said plurality of intended session participants; and facilitating communication at said second of said plurality of communications nodes associated with said at least one user preference.

2. The method of claim 1, further comprising the step of connecting said at least one of said plurality of intended session participants to said telemeeting session.

3. The method of claim 1, wherein said at least one identifier comprises a telephone number.

4. The method of claim 1, wherein said personal reference comprises a telephone number associated with a unique access node.

5. The method of claim 1, wherein said at least one identifier identifies an address in a Public Switched Telephone Network service node.

6. The method of claim 1, wherein said personal reference identifies a unique address in a node of a computer network.

7. The method of claim 6, wherein said unique address is a Uniform Resource Locator address in an Internet node.

8. The method of claim 1, wherein said at least one identifier includes an address part and a conference part, said conference part associated with a specific telemeeting out of a plurality of telemeetings.

9. A system for use in implementing an automated telemeeting session in a system comprising a plurality of service nodes, each one of said plurality of service nodes connected to at least a telecommunications network and having control of a plurality of communications nodes, said system comprising:

means for inputting definition information to one of said plurality of service nodes to define the telemeeting session;

means for outputting from said one of said plurality of service nodes at least one identifier associated with the telemeeting session;

means for distributing said at least one identifier as an invitation message to a plurality of intended session participants;

means for receiving at a first of said plurality of communications nodes associated with said at least one identifier, a response from at least one of said plurality of intended session participants, said response further including at least one user preference;

means for distributing from said one of said plurality of service nodes a personal reference to said at least one of said plurality of intended session participants, said personal reference associated with a second of said plurality of communications nodes, said second of said plurality of communications nodes associated with said at least one user preference;

means for receiving at said second of said plurality of communications nodes a request to participate in said telemeeting session from said at least one of said plurality of intended session participants; and means for facilitating communication at said second of said plurality of communications nodes associated with said at least one user preference.

10. The system of claim 9, further comprising:
means for connecting said at least one of said plurality of intended session participants to said telemeeting session.

11. The system of claim 9, wherein said means for inputting comprises a computer terminal.

12. The system of claim 9, wherein said means for outputting comprises a communications switch.

13. The system of claim 9, wherein said response from at least one of said plurality of intended session participants comprises a telephone call.

14. The system of claim 9, wherein said at least one identifier identifies an address in a Public Switched Telephone Network to a service node.

15. The system of claim 9, wherein said at least one identifier identifies an address in a node of a computer network.

16. The system of claim 15, wherein said address is a Uniform Resource Locator address in an Internet node.

17. A method for implementing an automated telemeeting session, comprising the steps of:

inputting definition information to a service node to define the telemeeting session;

responsive to said definition information, outputting from said service node a first identifier associated with the telemeeting session;

distributing said first identifier in an invitation message to an intended session participant;

receiving a response to the invitation message from the intended session participant, said response further including at least one user preference;

responsive to said response, selecting a personal reference based on a current location of the intended session participant and said at least one user preference;

distributing the personal reference to the intended session participant, said personal reference associated with one of a plurality of meeting places, said one of a plurality of meeting places associated with said at least one user preference; and the intended session participant participating in the telemeeting session at said one of a plurality of meeting places associated with the personal reference and said user preference.

18. The method of claim 17, wherein said one a plurality of meeting places is a closer one, relative to the intended session participant, of at least two possible meeting places.

19. The method of claim 17, further comprising the steps of alerting current participants of said telemeeting session, and identifying the intended session participant to the current participants prior to connecting the intended session participant to said telemeeting session.

20. The method of claim 17, further comprising the steps of connecting the intended session participant to said telemeeting session, and connecting a new session participant to said telemeeting session currently in progress without disconnecting the telemeeting session.

21. The method of claim 20, wherein said step of connecting a new session participant further includes the steps of:

distributing said first identifier in an invitation message to the new session participant;

receiving a response to the invitation message from the new session participant;

responsive to said response, selecting a personal reference based on a current location of the new session participant;

distributing the personal reference to the new session participant; and the new session participant participating in the telemeeting session at a meeting place associated with the personal reference.

22. The method of claim 17, wherein said personal reference includes a selected one of a telephone number and a Uniform Resource Locator address.

23. The method of claim 17, wherein said invitation message further includes a selected one of a facsimile message, an e-mail message, a page message, a voice mail message and a bulletin board announcement.

24. A system for implementing an automated telemeeting session, comprising:

means for inputting definition information to a service node to define the telemeeting session;

means, responsive to said definition information, for outputting from said service node a first identifier associated with the telemeeting session;

means for distributing said first identifier in an invitation message to an intended session participant;

means for receiving a response to the invitation message from the intended session participant, said response including at least one user preference;

means, responsive to the said response, for selecting a personal reference based on a current location of the intended session participant and said at least one user preference;

means for distributing the personal reference to the intended session participant, said personal reference associated with one of a plurality of meeting places, said one of a plurality of meeting places associated with said at least one user preference; and means for permitting the intended session participant to participate in the telemeeting session at said one of a plurality of meeting places associated with the personal reference and said user preference.

25. The system of claim 24, further comprising a means connecting the intended session participant to said telemeeting session.

26. The system of claim 24, further comprising means for identifying the intended session participant to current participants of said telemeeting session prior to connecting the intended session participant to said telemeeting session.

27. The system of claim 24, further comprising:

means for connecting the intended session participant to said telemeeting session; and means for connecting a new session participant to said telemeeting session currently in progress without disconnecting the telemeeting session.

28. The system of claim 24, wherein said personal reference includes a selected one of a telephone number and a Uniform Resource Locator address.

29. The system of claim 24, wherein said invitation message further includes a selected one of a facsimile message, an e-mail message, a page message, a voice mail message and a bulletin board announcement.

30. The system of claim 24, wherein said one of a plurality of meeting places is a closer one, relative to the intended session participant, of at least two possible meeting places.

* * * * *